April 12, 1938.  F. A. KORMANN  2,114,054
COMPASS APPARATUS
Filed Feb. 18, 1935  2 Sheets-Sheet 1
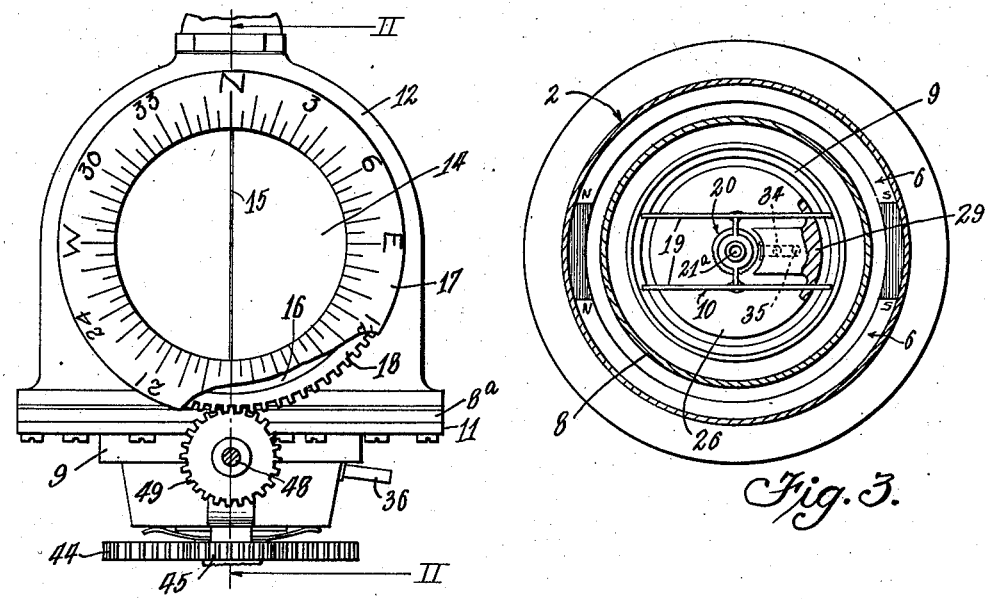
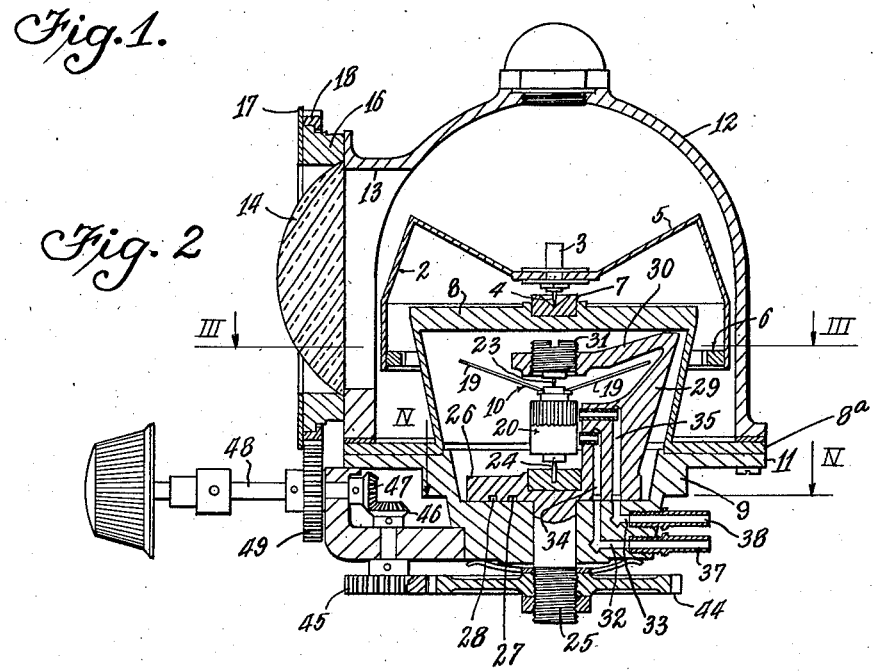
Inventor
Frederick A. Kormann
By Lyon & Lyon
Attorneys April 12, 1938.　　　F. A. KORMANN　　　2,114,054
COMPASS APPARATUS
Filed Feb. 18, 1935　　　2 Sheets-Sheet 2
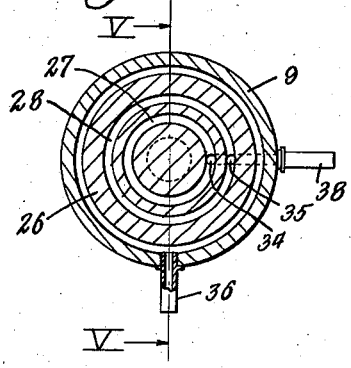
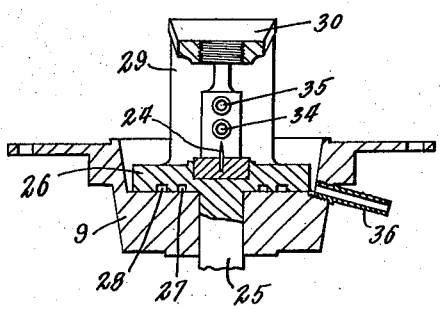
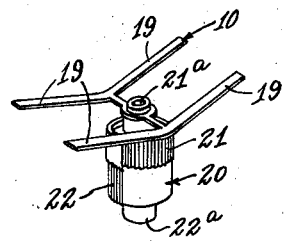
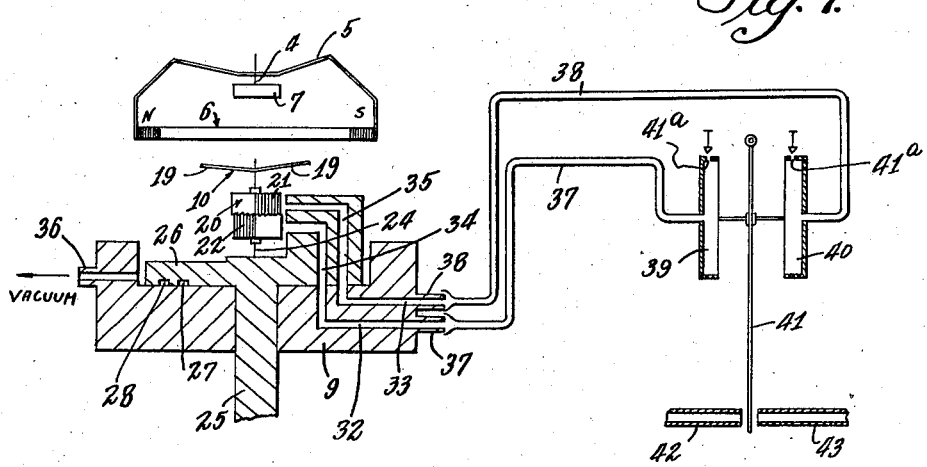
Inventor
Frederick A. Kormann
By Lyon & Lyon
Attorneys Patented Apr. 12, 1938

2,114,054

UNITED STATES PATENT OFFICE 2,114,054

COMPASS APPARATUS

Frederick A. Kormann, Glendale, Calif., assignor to Kormann Aero-Safety Appliance, Inc., Glendale, Calif., a corporation of Nevada Application February 18, 1935, Serial No. 6,933

6 Claims. (Cl. 33—222)

This invention relates to a compass apparatus, and more particularly relates to an apparatus including a compass and containing means by which other apparatus may be automatically actuated whenever the compass proper indicates the compass support is out of alignment with the desired direction.

The general object of the present invention is to provide a compass apparatus which may be mounted upon any moving body, such as an aeroplane, ship, or land traveling vehicle, and will automatically operate other devices whenever the moving body deviates in direction from a desired course.

The invention is of particular value for maintaining an aeroplane, dirigible or steamship automatically upon a desired compass course when connected with other controlled mechanisms.

A further object of the present invention is to provide the compass apparatus for automatically actuating a control apparatus in response to the deviation of the apparatus support from a desired direction, in which the connections between the magnet of the compass and the control apparatus are devoid of all electrical circuits. Heretofore, when it has been desired to control an automatic apparatus from a compass, the compass has been generally provided with electrical contacts which it is to make and break as it deviates from a desired position. Such apparatus has proved unreliable in service, and it is an object of the present invention to provide an apparatus which may connect the magnet of the compass with automatic apparatus without the necessity of including any electrical contacts.

A further object of the present invention is to provide a compass with a pneumatic connection with a control apparatus, and to provide such an arrangement that the pneumatic forces generated in operation will not in any way interfere with the magnet of the compass pointing to the true magnet north.

Another object of the present invention is to provide a compass apparatus including means for manually setting the apparatus so as to cause the follow-up control mechanism to be operated whenever the apparatus deviates from any predetermined desired direction and to include such mechanism as will readily indicate to the operator the direction at which the apparatus is designed to automatically maintain the airship, vessel or vehicle which supports the compass apparatus.

Various additional objects and advantages of the invention will be apparent from a description of a preferred form or example of an apparatus embodying the invention and for this purpose I have hereafter described, with reference to the accompanying drawings, a preferred form or example of an apparatus embodying the present invention.

In the drawings:

Figure 1 indicates an elevation of the apparatus, exclusive of the diaphragm-actuated valves.

Figure 2 is an elevation mainly in section on the line 2—2 of Figure 1.

Figure 3 is a section on the line 3—3 of Figure 2.

Figure 4 is a section on the line 4—4 of Figure 2.

Figure 5 is a section on the line 5—5 of Figure 4.

Figure 6 is a perspective view of the armature.

Figure 7 is a diagrammatic view of the apparatus showing its connection with diaphragm-actuated valves.

Referring to the drawings, the apparatus comprises a pivotally mounted magnetic member 2, which may be of various desired forms, but is shown as including a hub 3 having a pin shaft 4. The hub 3 carries a spider 5, which, in turn, supports the magnet proper 6 of the magnet member, which is shown to be of ring form. The magnet member is supported on the jewels 7 mounted upon the top of a casing member 8. The casing member 8 is one of two casing members 8 and 9, which together form an air-tight chamber for the armature 10. The casing member 8 is shown as provided with an annular flange 8ª adapted to be clamped against an annular flange 11 of the casing member 9. Mounted upon the flange 10ª and the casing member 8 is a casing head 12 of dome shape, which, together with the casing member 9, provides an enclosed casing for the magnet member. The casing member 12 is provided with a lateral opening 13 mounting a lens 14 having a suitable lubber line 15, by means of which the compass may be seen. The spider 2 around its lower periphery is provided with suitable graduations indicating the direction of the compass of the magnetic member. The lens 14 is held to the casing member 12 by a ring 16 held by screws or other suitable means, not shown. The ring 16, in turn, mounts a graduated dial 17 held to the ring by the inner face of an annular gear 18 attached to said ring 17.

The armature 10 includes armature needles 19 which are in position to be acted upon by the magnetic field of the magnet or magnets 6 of the magnet member and to be held by the magnetic field of such magnet or magnets 6 in alignment with the north and south poles of said magnets. The needle of the armature is originally attached to a supporting hub having an enlarged cylindrical portion 20. This cylinder is provided with an upper series of flutes 21 extending half-way around the periphery of the cylinder and with a lower series of flutes 22 extending around the other half of the periphery of the cylinder. The hub of the armature carries a jewel 21a in its upper end and a jewel 22a at its lower end. These jewels, in turn, are engaged by pins 23 and 24, respectively, by means of which the armature is revolvably mounted.

The lower pin 24 is mounted at the end of a stub shaft 25, which extends through the casing member 9, and at its upper end is provided with a disc flange 26 having two circular grooves 27 and 28, respectively, in its lower face. A lateral arm 29 extends from the shaft and has a return portion 30 extending over the armature 10 for supporting a screw 31, which carries the upper pin 23.

The lower casing member 9 is provided with bores 32 and 33, which respectively connect with the grooves 27 and 28 in the flange 26. The arm 29 is provided with vertical bores 34 and 35, respectively, which have discharge ports facing lower and upper fluted portions of the armature 10. The casing member 9 is provided with a bore receiving the tube 36 (Fig. 5), which tube may be used to connect the compass apparatus with a source of vacuum. In practice, when the apparatus is installed upon an aeroplane, the tube 36 is connected to the venturi and serves to maintain a slight vacuum within the chamber housing the armature 10.

The bores 32 and 33 are, respectively, connected by lines 37 and 38 to diaphragm chambers 39 and 40 which are oppositely connected to a member 41 for moving the member 41 in different directions. The diaphragm chambers 39 and 40 are each provided with adjustable bleeds 41a. In practice, the member 41 is used to make either electrical connections, or as it is moved from one side to the other it is preferably made to operate as a valve head alternately closing or opening the lines 42 or 43.

The apparatus includes means by which the compass course which will be maintained may be set in any desired direction. For this purpose, the shaft 25 is provided with a gear 44, in turn connected by gears 45, 46 with the gear 47 on a manually adjusting shaft 48. Adjusting shaft 48 is preferably provided with a gear 49, which engages the dial gear 18 so that this dial is automatically rotated to indicate to the operator the position that the apparatus is set to automatically maintain.

In operation of the apparatus of the present invention, the operator turns the knob on the shaft 48 to position the dial 17 relative to the lubber line 15 to indicate any desired compass course. Unless the apparatus is accurately on such compass course, one or the other of the fluted portions 20 and 21 on the hub of the armature will be presented to the bores 34 or 35. Thus, there is a greater vacuum placed upon one of the diaphragm chambers 39, 40 than the other, causing the member 41 to be moved over to close either line 42 and open line 43, or vice versa. Since the motion of the air pressure is towards the hub of the armature 10 there is no substantial action tending to hold this armature in any fixed position and it is free to revolve into position in alignment with the magnetic field of the magnet 2. This is an important feature of the present invention, as other compasses built to operate remote control apparatus have all been affected by the remote control apparatus so that they will not indicate a true magnetic position. With the present arrangement of apparatus this result is avoided and the apparatus is able to accurately indicate a desired position.

While the particular form of apparatus herein described is well adapted to carry out the objects of the present invention, this invention is not limited to the particular form shown but includes all such modifications and changes as come within the appended claims.

I claim:

1. An apparatus of the class described including a magnet mounted to operate as a compass, an enclosed chamber mounted adjacent said magnet, an armature mounted within said enclosed chamber coaxial of said magnet to be magnetically controlled thereby, connections for exhausting air from said chamber, means forming a pair of inlets to said chamber closely adjacent said armature, said armature being formed to differentially vary the flow from said inlets upon opposite deviations of the carrying craft from a set course respectively, and diaphragm chambers each connected with a respective inlet.

2. An apparatus of the class described, comprising a compass, an armature pivotally mounted independently of the compass coaxial thereof so as to be positionally controlled thereby, said armature having a rotor having two fluted portions axially and circumferentially displaced, inlets adapted to closely face said two fluted portions, the fluted portions and position of the inlets being arranged so that when one inlet is faced by a fluted portion the other is not, and as the armature is rotated to move the fluted portion from facing one inlet the other fluted portion is brought facing the other inlet, and means connecting said inlets with respective diaphragms.

3. An apparatus of the class described, comprising a compass, an armature pivotally mounted independently of the compass coaxial thereof so as to be positionally controlled thereby, said armature having a rotor having two fluted portions axially and circumferentially displaced, inlets adapted to closely face said two fluted portions, the fluted portions and position of the inlets being arranged so that when one inlet is faced by a fluted portion the other is not, and as the armature is rotated to move the fluted portion from facing one inlet the other fluted portion is brought facing the other inlet, means connecting said inlets with respective diaphragms, and means for manually revolving said inlets about the axis of said armature to set a desired course.

4. In an apparatus of the class described, an armature member including a rotor having smooth and fluted portions, an enclosure for said armature, said enclosure having a connection to a source of pressure other than atmospheric, and two ports closely adjacent the fluted portion of said rotor, said ports being so arranged with respect to each other that when one port faces the fluted portion of said surface, the other faces the smooth portion.

5. In an apparatus of the class described, an armature member including a rotor having a surface including smooth and fluted portions, an enclosure for said armature having a connection to a source of vacuum, two diaphragm chambers each comprising a casing and a movable diaphragm, operative connections between said operating member and said diaphragms, two ports closely adjacent said surface, said ports being so arranged with respect to each other that when one port faces the fluted portion of said surface the other faces the smooth portion, and means connecting each one of said ports with a respective one of said chambers.

6. In an apparatus of the class described, an armature member including a rotor having a surface including fluted and smooth portions, an enclosure for said armature, said enclosure having a connection to a source of pressure other than atmospheric, two diaphragm chambers each comprising a casing and a movable diaphragm, operative connections between said diaphragms, two ports closely adjacent said surface, said ports being so arranged with respect to each other that when one port faces the fluted portion of said surface the other faces the smooth portion, and means connecting each one of said ports with a respective one of said chambers.

FREDERICK A. KORMANN.